(12) United States Patent
Faulkner

(10) Patent No.: US 12,487,133 B2
(45) Date of Patent: Dec. 2, 2025

(54) DETECTING COMPONENT TEMPERATURE IN A SYSTEM

(71) Applicant: Edwards Vacuum LLC, Sanborn, NY (US)

(72) Inventor: Budd Edward Faulkner, Hillsboro, OR (US)

(73) Assignee: Edwards Vacuum LLC, Sanborn, NY (US)

( * ) Notice: Subject to any disclaimer, the term of this patent is extended or adjusted under 35 U.S.C. 154(b) by 670 days.

(21) Appl. No.: 17/760,055

(22) PCT Filed: Feb. 5, 2021

(86) PCT No.: PCT/IB2021/050941
§ 371 (c)(1),
(2) Date: Aug. 3, 2022

(87) PCT Pub. No.: WO2021/156805
PCT Pub. Date: Aug. 12, 2021

(65) Prior Publication Data
US 2023/0065309 A1     Mar. 2, 2023

(30) Foreign Application Priority Data
Feb. 6, 2020  (GB) ..................... 2001578

(51) Int. Cl.
*G01K 7/32*     (2006.01)
*G01K 1/024*    (2021.01)
(Continued)

(52) U.S. Cl.
CPC ............... *G01K 7/32* (2013.01); *G01K 1/024* (2013.01); *G06K 7/10297* (2013.01);
(Continued)

(58) Field of Classification Search
CPC ...... G01K 7/32; G01K 1/024; G06K 7/10297; G06K 19/0717; G06K 19/0723;
(Continued)

(56) References Cited

U.S. PATENT DOCUMENTS

2004/0233043 A1    11/2004  Yazawa et al.
2016/0223411 A1*   8/2016   Gebhardt ............. G01K 11/006
2019/0316969 A1*   10/2019  Zhang ................ G06K 19/0717

FOREIGN PATENT DOCUMENTS

CN      102741865 A   * 10/2012   ......... G06K 19/0707
CN      110030800 A     7/2019
(Continued)

OTHER PUBLICATIONS

Taiwanese Search Report dated May 24, 24 for corresponding Taiwanese application Serial No. 110104495, 1 page.
(Continued)

*Primary Examiner* — John E Breene
*Assistant Examiner* — Janice M Soto
(74) *Attorney, Agent, or Firm* — Theodore M. Magee; Westman, Champlin & Koehler, P.A.

(57) ABSTRACT

There is provided a method of detecting the temperature of a component of a support system for semiconductor processing equipment, the method comprising: applying a radio frequency identity tag to the component, the radio frequency identity tag having a serial number; reading the radio frequency identity tag with a reader, the reader arranged to read the serial number of the radio frequency identity tag, and to identify the resonant frequency of the radio frequency identity tag; and converting the resonant frequency of the radio frequency tag to a temperature of the radio frequency identity tag.

9 Claims, 10 Drawing Sheets

(51) Int. Cl.
  *G06K 7/10*    (2006.01)
  *G06K 19/07*   (2006.01)
  *G06K 19/077*  (2006.01)

(52) U.S. Cl.
  CPC ..... *G06K 19/0717* (2013.01); *G06K 19/0723* (2013.01); *G06K 19/07758* (2013.01); *G06K 2007/10504* (2013.01)

(58) Field of Classification Search
  CPC ... G06K 19/07758; G06K 2007/10504; G06K 7/10148; G06K 7/10405
  See application file for complete search history.

(56) References Cited

FOREIGN PATENT DOCUMENTS

| | | | |
|---|---|---|---|
| JP | H06300241 A | | 10/1994 |
| JP | H10227702 A | | 8/1998 |
| JP | 2004144683 A | * | 5/2004 |
| JP | 2007079785 A | | 3/2007 |
| JP | 2007249735 A | | 9/2007 |
| JP | 2010072957 A | | 4/2010 |
| KR | 20090022566 A | * | 3/2009 |
| KR | 20150124705 A | | 11/2015 |
| KR | 20170115613 A | * | 10/2017 |
| TW | 515156 B | | 12/2002 |
| WO | 2006131674 A2 | | 12/2006 |
| WO | 2014181667 A1 | | 11/2014 |

OTHER PUBLICATIONS

British Examination Report dated Sep. 3, 2020 and Search Report dated Aug. 4, 2020 for corresponding British application Serial No. GB2001578.0, 13 pages.

PCT Notification of Transmittal of the International Search Report and the Written Opinion of the International Searching Authority, or the Declaration dated Mar. 31, 2021 and Search Report dated Mar. 31, 2021 for corresponding PCT application Serial No. PCT/IB2021/050941, 5 pages.

PCT Written Opinion dated Mar. 31, 2021 for corresponding PCT application Serial No. PCT/IB2021/050941, 9 pages.

Japanese Notice of Reasons for Refusal dated Feb. 12, 2025 for corresponding Japanese application Serial No. 2022-547248, 10 pages.

Chinese First Office Action and Search Report dated Feb. 22, 2025 for corresponding Chinese application Serial No. 202180013015.X, 25 pages.

* cited by examiner

DETECTING COMPONENT TEMPERATURE IN A SYSTEM

CROSS-REFERENCE TO RELATED APPLICATION

This application is a Section 371 National Stage Application of International Application No. PCT/IB2021/050941, filed Feb. 5, 2021, and published as WO 2021/156805 A1 on Aug. 12, 2021, the content of which is hereby incorporated by reference in its entirety and which claims priority of British Application No. 2001578.0, filed Feb. 6, 2020.

FIELD

The present invention relates to a method of detecting the temperature of a component of a support system for a process pipe of semiconductor processing equipment, a reader for detecting the temperature of a component of a support system for semiconductor processing equipment, a radio frequency identity tag for detecting the temperature of a component of a support system for semiconductor processing equipment, a program or plurality of programs, and a machine-readable storage medium.

BACKGROUND

Pipes to and from semiconductor equipment for various processes and uses can be subject to build up of deposits which adversely affect the operation of the pipes. Such semiconductor equipment may comprise semiconductor fabrication equipment. Deposits might build up as a result of condensation at a cold spot. Monitoring the temperature at numerous points along a pipe can help identify cold spots, or if the temperature of a fluid in the pipe is falling below an optimum level to minimise condensate or deposit formation.

Additionally, when heating a pipe, for example to prevent condensation forming inside the pipe, it is important to ensure the pipe does not get too hot and exceed the safe operating temperatures of the pipe contents, the pipe material, the heating component, and any insulating material. Monitoring the temperature at numerous points along a pipe can help identify hot spots, which may be caused by malfunctioning heaters or an exothermic reaction within the pipe. Such hot spots can cause equipment failure. Identification of hot spots can be used to instigate remedial action such as shutting down a heater, shutting down a process, or activating a quenching function.

Similarly, a vacuum pump and abatement system for a semiconducting processing equipment may be a part of an integrated system for semiconductor manufacturing. Such systems require a power distribution system to deliver electrical power, typically at high voltage, to individual modules of the system. Such integrated systems are becoming increasingly complex, smaller, and have more restrictive access for servicing and maintenance activities. As a result, sophisticated and integrated high voltage electrical assemblies are occupying less space and are being relocated to areas of the system with significantly reduced maintenance access. Faults in the power distribution system can result in costly downtime of the apparatus it provides power to, such as semiconducting processing equipment. An early indication of a fault in such an electrical system can be determined by detecting an elevated temperature in a component of the power distribution system.

Typically, an electrical temperature sensor may be used to monitor the temperature of a component such as a process pipe of semiconductor equipment. This may comprise a thermocouple connected to appropriate detection circuitry. However, each such thermocouple is a relatively expensive device. Further, each thermocouple requires additional wiring and control circuitry, the complexity of which adds to the installation cost. These factors render such electrical temperature sensors unsuitable for deployment in large numbers. Further, where insulation jackets and/or heating jackets are applied to the pipes, these can interfere with the sensor deployment and wiring. In power distribution systems, such wiring must be well insulated and protected from high voltage components.

Alternative electronic temperature sensing devices may use any of: thermistors, resistance temperature detectors (RTDs) and infrared sensors. While some of these may be cheaper than a thermocouple, they still require cumbersome cabling and/or the additional expense of communication circuitry.

It is also possible to detect temperature with a mechanical switch indicator such as a thermostat or a capillary probe. However, these typically give only low resolution readings, and present additional difficulties in monitoring and relaying to monitoring devices.

An improved arrangement for measuring the temperature of components of support systems for semiconductor processing equipment such as process pipes and systems for distributing electrical power is needed.

The discussion above is merely provided for general background information and is not intended to be used as an aid in determining the scope of the claimed subject matter. The claimed subject matter is not limited to implementations that solve any or all disadvantages noted in the background.

SUMMARY

It has been found that radio frequency identity (RFID) tags have a resonant frequency response dependent on temperature. There is described herein a cost-effective method to detect the temperature of components, such as pipes, by applying RFID tags down a pipe length on the pipe itself. A reader with resonance frequency detection is able to scan the component and determine the temperature of the RFID tag attached to it. This provides a cost-effective way to monitor a plurality of components within a system, where each component has an RFID tag attached thereto.

There is provided a method of detecting the temperature of a component of a support system for semiconductor processing equipment, the method comprising: applying a radio frequency identity tag to the pipe, the radio frequency identity tag having a serial number; reading the radio frequency identity tag with a reader, the reader arranged to read the serial number of the radio frequency identity tag, and to identify the resonant frequency of the radio frequency identity tag; and converting the resonant frequency of the radio frequency tag to a temperature of the radio frequency identity tag.

The component of a support system for semiconductor processing equipment may comprise a process pipe for semiconductor processing equipment. The component of a support system for semiconductor processing equipment may comprise a power distribution system for distributing electrical power.

There is also provided a method of detecting the temperature of a process pipe of semiconductor equipment, the method comprising: applying a radio frequency identity tag to the process pipe, the radio frequency identity tag having a serial number; reading the radio frequency identity tag with a reader, the reader arranged to read the serial number of the radio frequency identity tag, and to identify the resonant frequency of the radio frequency identity tag; and converting the resonant frequency of the radio frequency tag to a temperature of the radio frequency identity tag.

There is further provided a method of detecting the temperature of a component of a system for distributing electrical power, the system comprising a busbar, and a plurality of electrical modules connected to the busbar, the method comprising: applying a radio frequency identity tag to the component, the radio frequency identity tag having a serial number; reading the radio frequency identity tag with a reader, the reader arranged to read the serial number of the radio frequency identity tag, and to identify the resonant frequency of the radio frequency identity tag; and converting the resonant frequency of the radio frequency tag to a temperature of the radio frequency identity tag.

In some implementations many RFID tags will be installed. Accordingly, the method may further comprise, when the radio frequency identity tag is applied to the component, recording the serial number and installation location of the radio frequency identity tag in a database; and when a temperature reading is subsequently obtained, the location of that temperature reading is determined by looking up the serial number of the radio frequency identity tag in the database.

There is further provided a reader for detecting the temperature of a component of a support system of semiconductor processing equipment, the reader comprising: a transmitter, a receiver, and a processor. The transmitter is arranged to transmit a signal to a radio frequency identity tag attached to the process pipe, the radio frequency identity tag having a serial number. The receiver is arranged to receive the serial number of the radio frequency identity tag. The reader is further arranged to identify the resonant frequency of the radio frequency identity tag. The processor is arranged to convert the resonant frequency of the radio frequency tag to a temperature of the radio frequency identity tag.

The reader may comprise a long read-in antenna arranged along the length of the component. The long read-in antenna may be connected to at least one of the transmitter and the receiver.

The process pipe and the RFID tag are in thermodynamic equilibrium such that the temperature of the component may be determined to be the same as the temperature of the radio frequency identity tag.

Identifying the resonant frequency of the radio frequency identity tag may comprise transmitting a series of different frequency signals to the radio frequency identity tag and determining the signal strength of a signal received from the radio frequency identity chip for each different frequency signal. This is preferred for a passive RFID tag.

Identifying the resonant frequency of the radio frequency identity tag may comprise detecting the frequency of a signal received from the radio frequency identity chip. This is preferred for an RFID tag that includes a battery, such as an active RFID tag, and for a battery assisted passive RFID tag.

There is further provided a radio frequency identity tag for detecting the temperature of a component of a support system for semiconductor processing equipment, the radio frequency identity tag comprising: an antenna arranged to be placed in thermal communication with the component; a case; an electrically insulating pad, the electrically insulating pad separating the antenna from the component and electrical parts electrically coupled to the antenna and arranged to be remote from the component.

There is also provided a radio frequency identity tag for detecting the temperature of a process pipe of semiconductor equipment, the radio frequency identity tag comprising: an antenna arranged to be placed in thermal communication with the process pipe; an electrically insulating pad, the electrically insulating pad separating the antenna from the process pipe; and electrical parts electrically coupled to the antenna and arranged to be remote from the process pipe.

There is further provided a radio frequency identity tag for detecting the temperature of a component of a system for distributing electrical power, the radio frequency identity tag comprising: an antenna arranged to be placed in thermal communication with the component; an electrically insulating pad, the electrically insulating pad separating the antenna from the component; and electrical parts electrically coupled to the antenna and arranged to be remote from the component.

The antenna, electrically insulating pad and electrical parts may be encased in a case. The case may be a polyimide case. The electrically insulating pad may be an electrical insulator that is thermally conductive. The electrically insulating pad may provide good thermal conductivity between the component and the electrical parts of the radio frequency identity tag.

The electrical parts may be separate from the antenna by a communication wire. The electrical parts may be arranged within a tail of the RFID tag.

The insulating pad may be an electrically insulating and thermally conductive pad. Such a pad can be formed from silicone rubber or an epoxy filled with boron nitride or aluminium nitride. By way of example, Aluminium Nitride has a thermal conductivity of up to 285 W/mK but is a semiconductor. This compares well to well-known metal heat conductors, such as copper which has a thermal conductivity of 385 W/mK.

The RFID tag may be built into a heating pad for a pipe, the heating pad arranged to be fixed to the exhaust pipe. The heating pad may be the electrically insulating pad. The electrically insulating pad may be part of a heating pad, the heating pad containing heating elements. The heating elements may comprise electrical heating wires. The antenna and electrical parts may be encased in a case. The case may be a polyimide case.

The radio frequency identity tag may further comprise an adhesive pad for affixing the insulating pad to the component. The adhesive pad may comprise thermal adhesive tape. For example, 3M® 8810 thermally conductive adhesive transfer tapes which are designed to provide a preferential heat-transfer path between heat-generating components and parts affixed thereto.

The radio frequency identity tag may be one of a passive tag, an active tag, or a battery assisted passive tag.

The radio frequency identity tag may include a memory for storing a serial number, the serial number transmitted by the radio frequency identity tag when the radio frequency identity tag is interrogated.

Upon installation of the radio frequency identity tag, the serial number and installation location of the radio frequency identity tag is recorded, such that when a temperature reading is subsequently obtained, the location of that temperature reading can be determined.

The electrically insulating pad may be an electrical insulator which provides good thermal conductivity between the component and the antenna of the radio frequency identity tag. The radio frequency identity tag may further comprise a thermal insulation layer, the thermal insulation layer separating the electrical parts of the radio frequency identity tag from the antenna, the electrically insulating pad, and the component.

There is further provided a program or plurality of programs arranged such that when executed by a computer system or one or more processors it/they cause the computer system or the one or more processors to operate in accordance with the methods described herein.

There is further provided a machine-readable storage medium storing a program or at least one of the plurality of programs described herein.

The summary is provided to introduce a selection of concepts in a simplified form that are further described in the detailed description. This summary is not intended to identify key features or essential features of the claimed subject matter, nor is it intended to be used as an aid in determining the scope of the claimed subject matter.

All figures are for illustrative purposes and are not to scale.

DETAILED DESCRIPTION

RFID tags contain at least two parts: an integrated circuit that stores and processes information and that modulates and demodulates radio-frequency (RF) signals; and an antenna for receiving and transmitting the signal. The tag information is stored in a non-volatile memory which is part of the integrated circuit. A reader transmits an encoded radio signal to interrogate the tag. The RFID tag receives the message and then responds with its unique serial number. Since tags have individual serial numbers, the RFID system design can discriminate among several tags that might be within the range of antenna of the RFID reader and read them simultaneously.

Radio frequency identity tags comprise an integrated circuit electrically connected to the antenna. The integrated circuit comprises a memory component for storing information, such as the serial number, and communication circuitry for sending and receiving radio signals.

Radio frequency identity tags are powered in different ways. A passive tag includes a means of collecting DC power from the incident reader signal which powers the RFID tag and the transmission. An active tag includes a power supply, typically an on-board battery and periodically transmits its ID signal. A battery assisted passive tag has a small battery on board, but the RFID tag is activated when an interrogation signal is received from an RFID reader. The battery and chip are electrical components of the RFID tag, herein these are referred to as electrical parts. These electrical parts are electrical parts other than the antenna.

The information stored in the radio frequency identity tag is typically a serial number, the serial number is unique and is transmitted by the radio frequency identity tag when the radio frequency identity tag is interrogated. The serial number is stored in a memory component of the chip.

Figure 1:
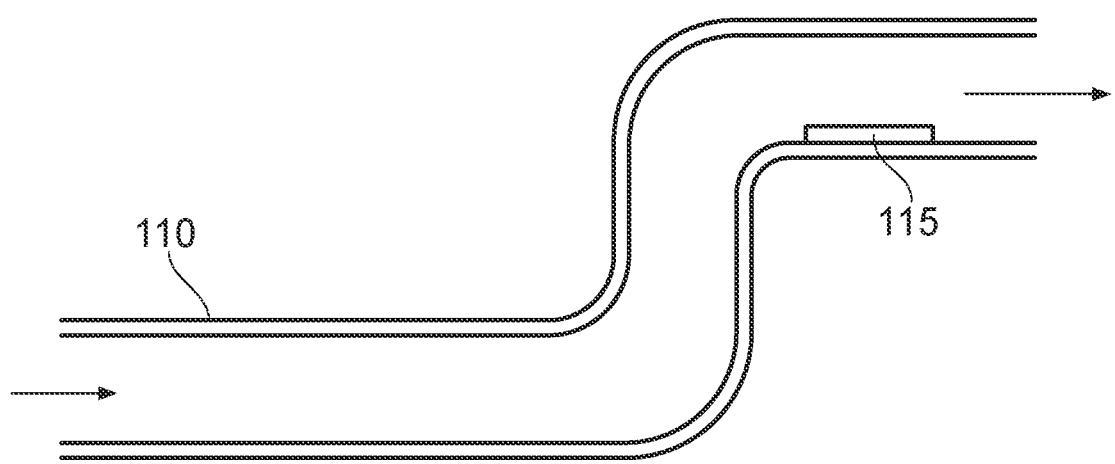
FIG. 1 illustrates an example component, the temperature of which is to be determined.

An example component, the temperature of which is to be determined, is illustrated in FIG. 1. In this example, the component is a process pipe 110 carrying a hot gas from left to right. Such a pipe is an example of a component of a support system for semiconductor processing equipment. The hot gas includes a vapour that gives rise to condensate deposits 115 in the pipe 110. In the example shown a pool of condensate 115 has a tendency to occur after the second bend in the pipe 110. Such a pipe might carry supply gases to the semiconductor processing equipment or carry used gases away from the semiconductor processing equipment. Such waste gases may be processed by an abatement system. In the present context, 'semiconductor processing equipment' refers to equipment suitable for processing semiconductor material, such as a wafer to produce semiconductor devices such as transistors, memory or processors. Another example of a component of a support system for semiconductor processing equipment is the busbar of an electrical power distribution system.

Figure 2A:
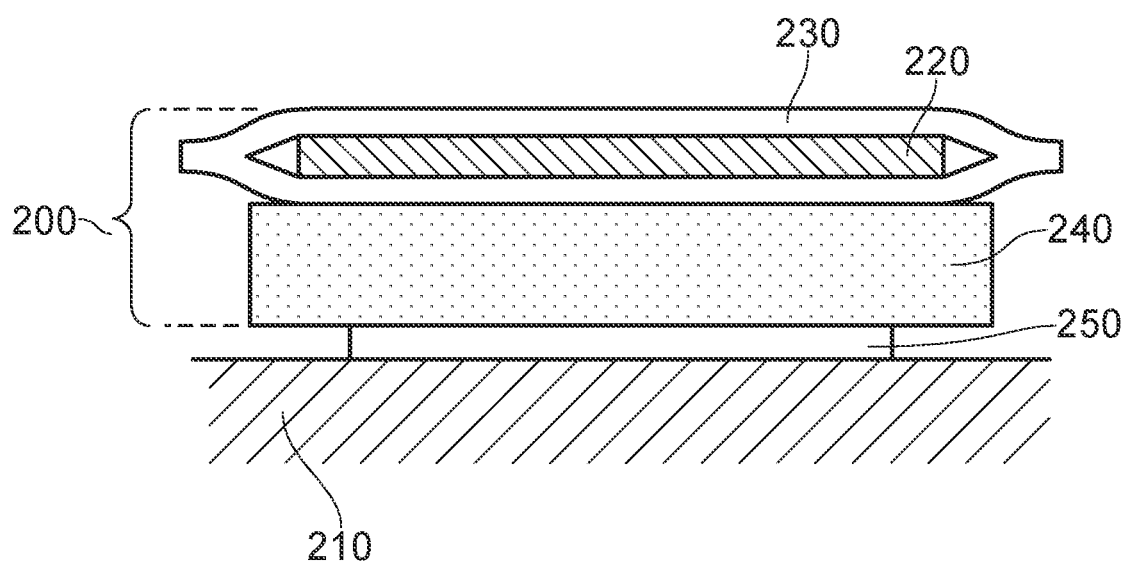
FIGS. 2A, 2B and 2C illustrate radio frequency identity tags for detecting the temperature of a component.

FIG. 2A illustrates a radio frequency identity tag 200 for detecting the temperature of a component 210. Component 210 may be a pipe. Component 210 may be a busbar interconnection. The radio frequency identity tag 200 comprises an antenna 220, a polyimide case 230, and an insulating pad 240. The insulating pad 240 separates the antenna 220 from the component 210.

Antenna 220 is part of an electronics layer of the RFID tag. The electronics layer includes the integrated circuit of the RFID tag. The integrated circuit is not separately shown in FIG. 2.

FIG. 2A additionally shows an adhesive pad 250 for sticking affixing the insulating pad 240 to the component 210. The adhesive pad 250 is a thermal adhesive tape, an example of which is 3M® 8810 thermally conductive adhesive transfer tapes. Such tapes are designed to provide a preferential heat-transfer path between heat-generating components and heat sinks or other cooling devices such as fans, heat spreaders or heat pipes. Adhesive pad 250 is optional as the RFID tag 200 can be held in position by other means, such as a strap, or may be incorporated into another part fixed to the component such as an insulating jacket. For example, the RFID tag may be built into a heating pad, the heating pad arranged to be fixed to the component 210.

The insulating pad 240 is an electrical insulator which improves the operation of the antenna 220 and provides good thermal conductivity between the component 210 and the antenna 220 in the electronics layer of the radio frequency identity tag.

The insulating pad 240 is an electrically insulating thermally conductive pad. The insulating pad 240 increases the separation between the antenna 220 and the component 210. In some implementations, the component 210 is made of metal and is therefore electrically conductive. An advantage of the insulating pad 240 is that it improves the radio frequency operation of the antenna 220 when the RFID tag 200 is mounted to a metal component 210.

The insulating pad 240 is formed from silicone rubber with Zinc Oxide filler to increase the thermal conductivity. Alternatively, the insulating pad 240 comprises an epoxy filled with boron nitride or aluminium nitride. By way of example, Aluminium Nitride has a thermal conductivity of up to 285 W/mK but is a semiconductor. This compares favourably to well-known metal heat conductors, such as copper which has a thermal conductivity of 385 W/mK.

Figure 2B:
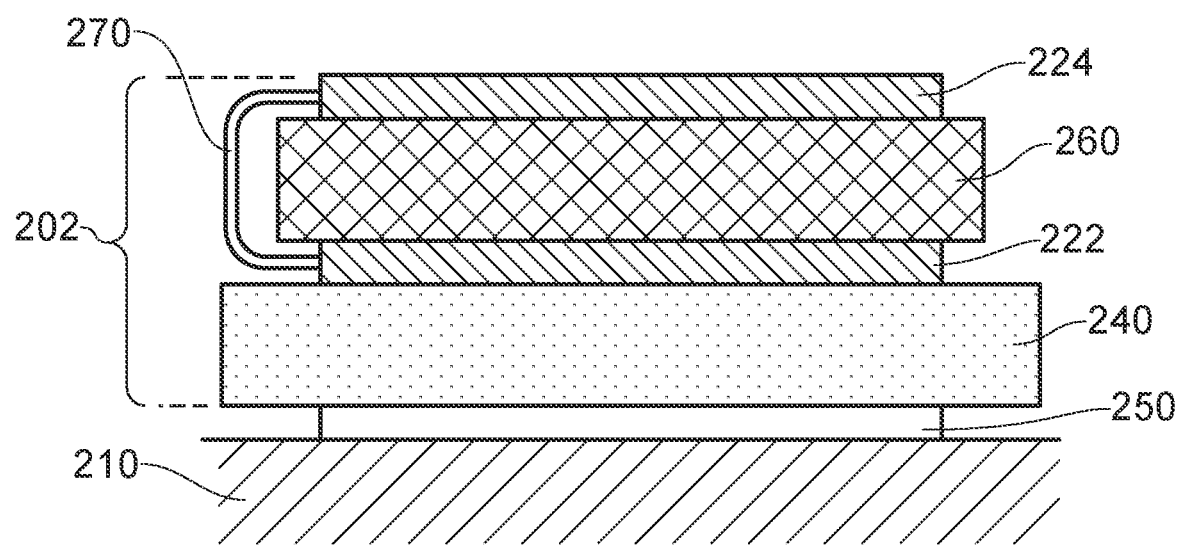

FIG. 2B illustrates an alternative arrangement of an RFID tag 202 for detecting the temperature of a component 210. RFID tag 202 comprises an electrically insulating pad 240, an antenna 222, a thermally insulating pad 260, connecting wires 270, and electrical parts 224. The antenna 222 and the electrical parts 224 are electrically connected by connecting wires 270. RFID tag 202 comprises separated antenna and electrical parts such that the antenna is in thermal communication with the component 210 and the electrical parts 224 are separated from the antenna 222 and the component 210 by thermal insulation. Thus, in operation, the electrical parts 224 of the RFID tag 202 tend to be at a lower temperature than the component 210. This can improve the operating temperature range and/or lifespan of the RFID tag 202.

Figure 2C:
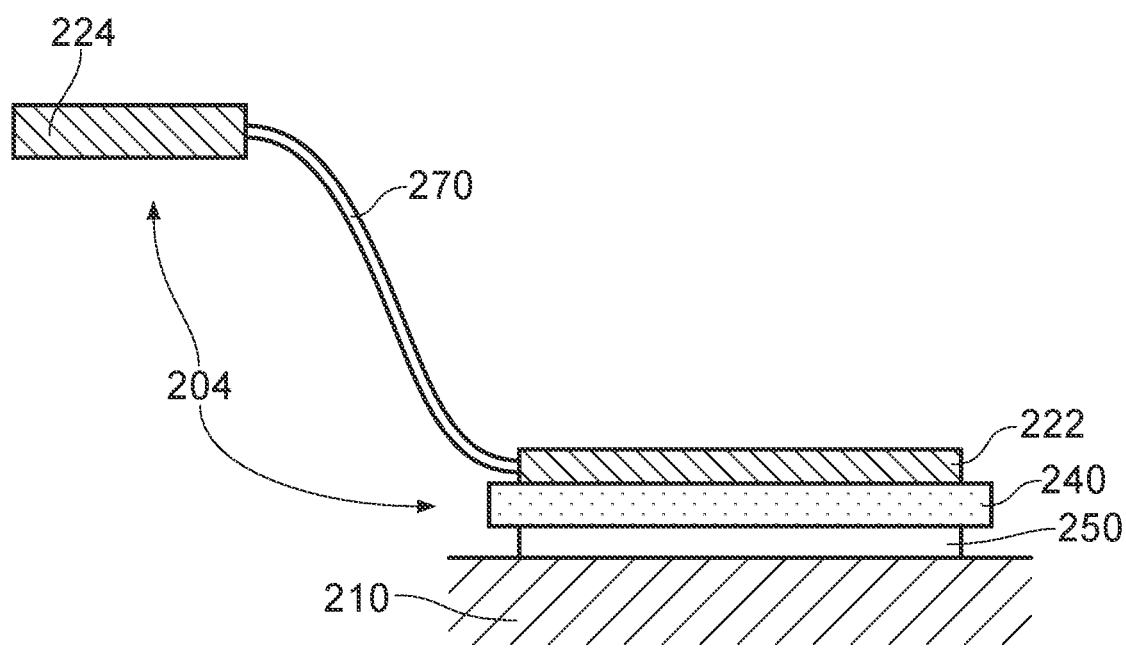

FIG. 2C illustrates an alternative arrangement of an RFID tag 204 for detecting the temperature of a component 210. RFID tag 204 comprises an electrically insulating pad 240, an antenna 222, connecting wires 270, and electrical parts 224. The antenna 222 and the electrical parts 224 other than the antenna 222 are electrically connected by the connecting wires 270. RFID tag 204 comprises separated antenna and electrical parts such that the antenna is in thermal communication with the component 210 and the electrical parts 224 are separated from the antenna 222 by a length of connecting wire 270. The connecting wire 270 and the electrical parts 224 may be referred to as the tail of RFID tag 204. The tail allows the electrical parts to be spatially separated from the component 210. In use, the electrical parts 224 may be placed in a lower temperature environment, such as ambient air temperature. Thus, in operation, the electrical parts 224 of the RFID tag 204 tend to be at a lower temperature than the component 210. This can improve the operating temperature range and/or lifespan of the RFID tag 204.

Figure 3A:
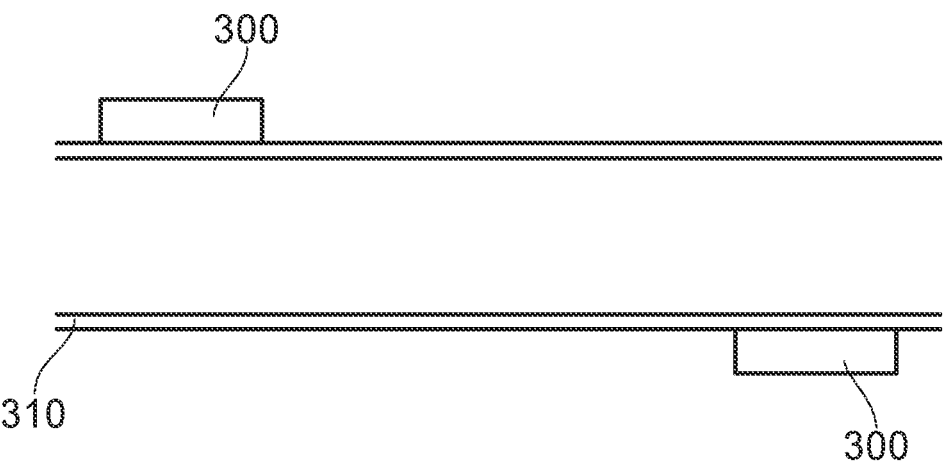
FIGS. 3A, 3B and 3C show different applications of RFID tags as described herein.
Figure 3B:
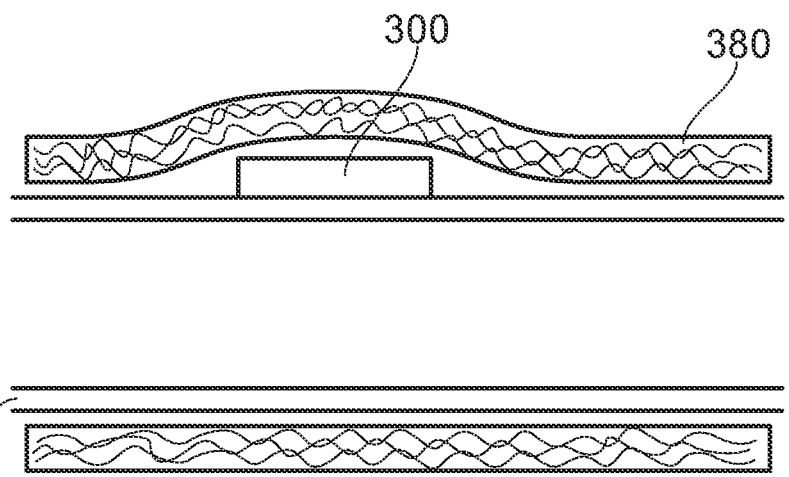
Figure 3C:
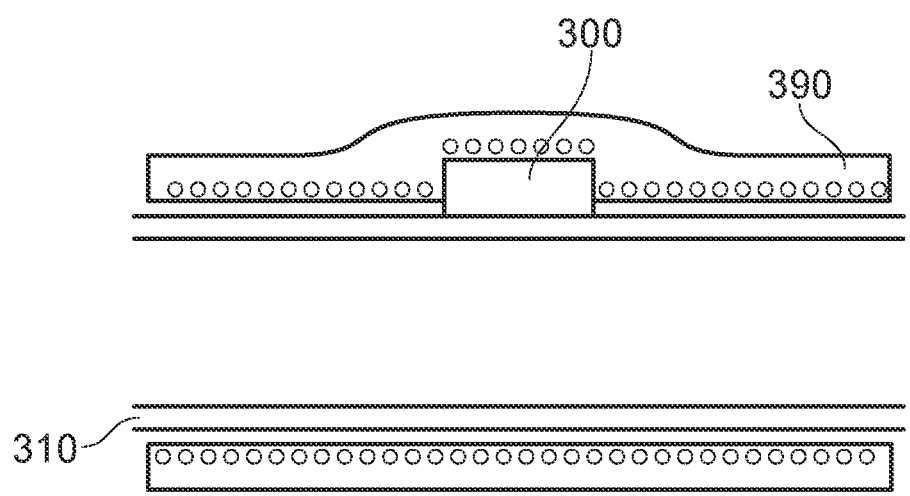

FIG. 3A shows two RFID tags 300 affixed to a pipe 310 at different locations. FIG. 3B shows an RFID tag 300 affixed to a pipe 310 with thermal insulation 380 mounted over the RFID tag 300. It is preferable that the thermal insulation additionally covers the RFID tag 300 to ensure an accurate temperature reading of the pipe 310. FIG. 3C illustrates an RFID tag 300 which is part of a heating jacket 390, the heating jacket 390 affixed to the pipe 310 which in turn holds the RFID tag 300 against the pipe 310. To ensure an accurate temperature reading, heating elements within the heating jacket are preferably not mounted between the RFID tag and the pipe 310 or on top of the RFID tag 300 adjacent to the polyimide case 230 and the electronics layer therein. The pipe 310 may be an exhaust pipe from semiconductor processing equipment.

Where RFID tag 300 is covered by a jacket, an indication such as a mark, colour patch or sticker may be made on an outer surface of the jacket such that installed RFID tags may be more readily located after installation.

Figure 4:
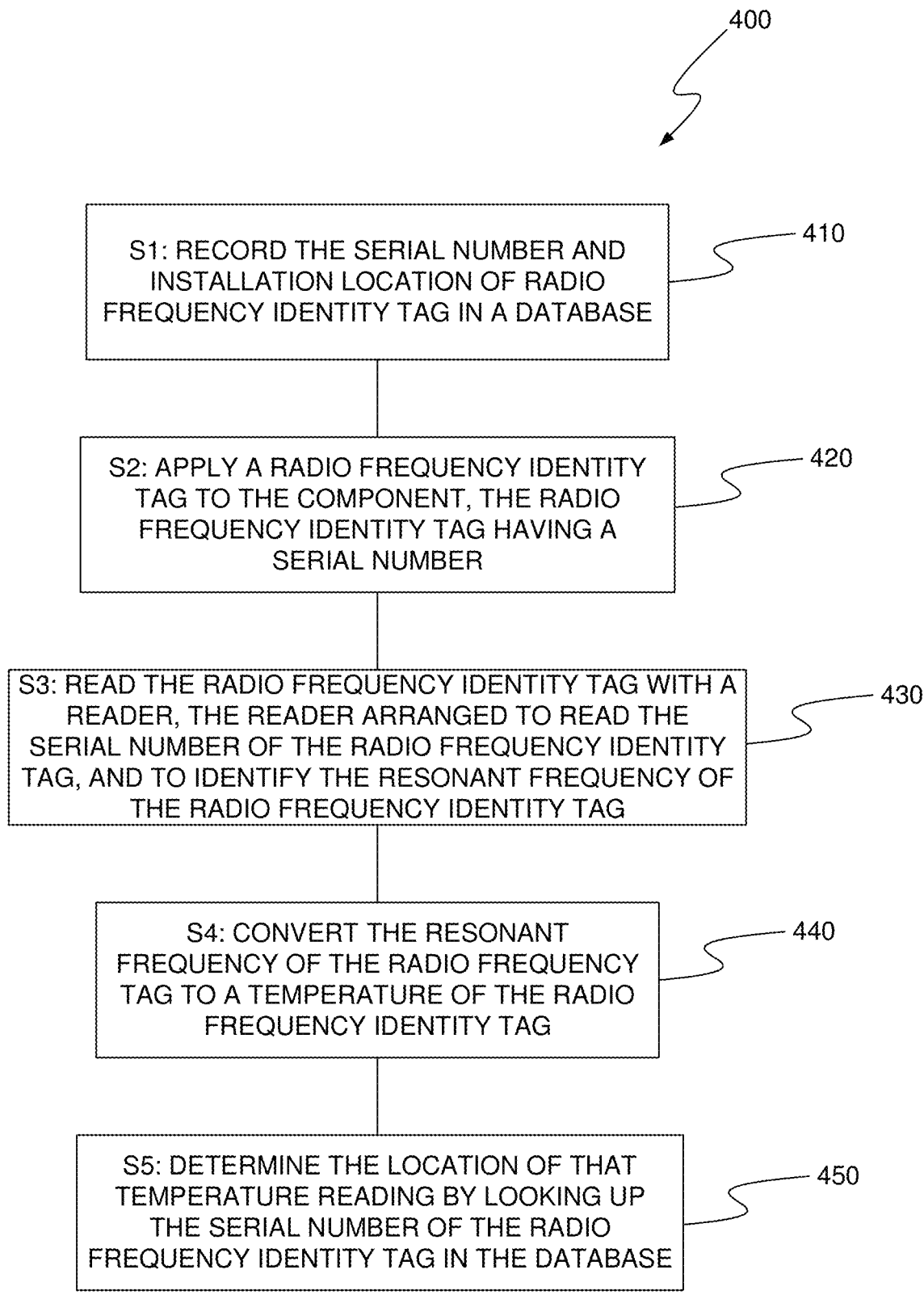
FIG. 4 illustrates a method of detecting the temperature of a component.

FIG. 4 illustrates a method 400 of detecting the temperature of a component. The method 400 comprises S2, applying 420 a radio frequency identity tag to the component, the radio frequency identity tag having a serial number; S3, reading 430 the radio frequency identity tag with a reader, the reader arranged to read the serial number of the radio frequency identity tag, and to identify the resonant frequency of the radio frequency identity tag; and S4, converting 440 the resonant frequency of the radio frequency tag to a temperature of the radio frequency identity tag.

Converting 440 the detected resonant frequency to a temperature is performed using a look-up table. The look-up table is established for the type of RFID tag allowing detected resonant frequency to be translated into a temperature reading. Alternatively, each RFID tag is calibrated before installation to identify the relationship between temperature and resonant frequency for each specific RFID tag. This information is stored in a look-up table together with the RFID tag serial number. After installation, when the resonant frequency of an RFID tag is determined, together with its serial number, the serial number is used to identify the relationship between resonant frequency and temperature for that specific RFID tag.

In some implementations many RFID tags will be installed. Accordingly, the method may further comprise, when the radio frequency identity tag is applied to the component, S1, recording 410 the serial number and installation location of the radio frequency identity tag in a database; and when a temperature reading is subsequently obtained 440, S5, determining 450 the location of that temperature reading by looking up the serial number of the radio frequency identity tag in the database.

Figure 5:
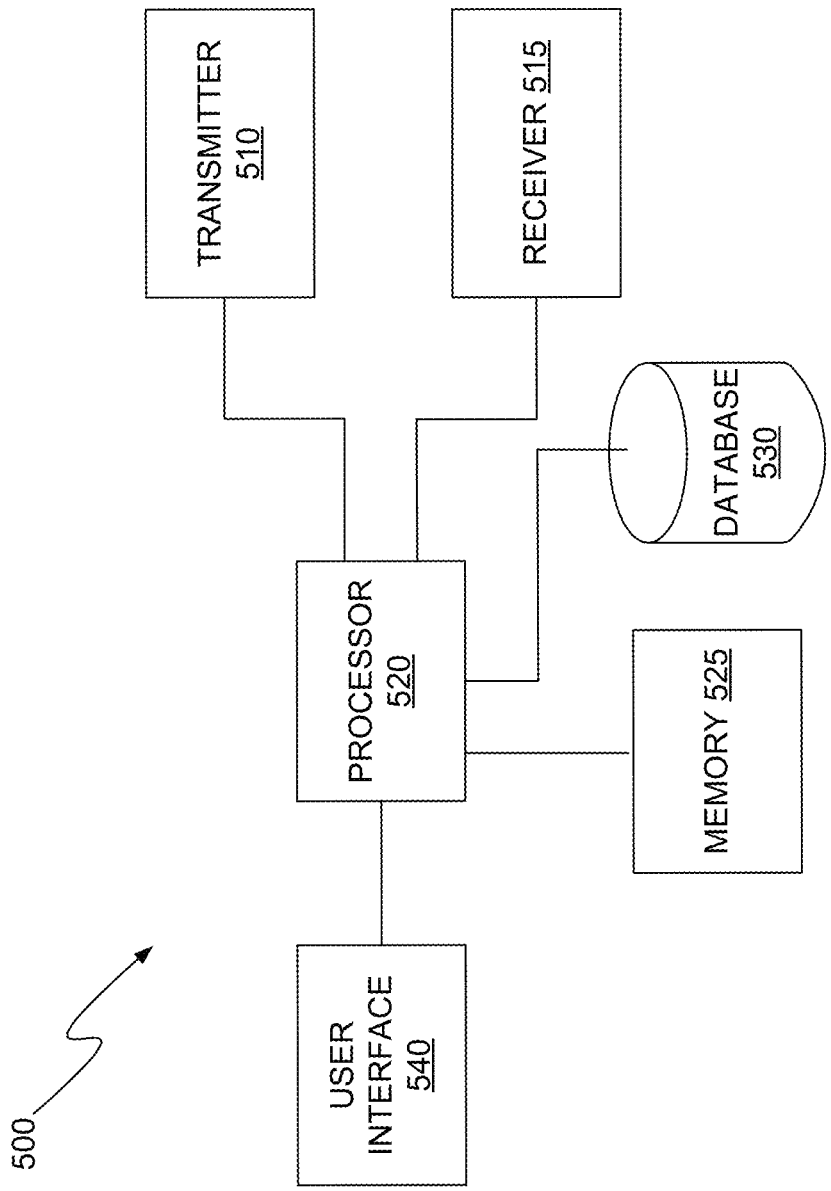
FIG. 5 illustrates a reader for detecting the temperature of a component.

FIG. 5 illustrates a reader 500 for detecting the temperature of a component. The reader comprises a transmitter 510, a receiver 515, and a processor 520. The transmitter 510 is arranged to transmit a signal to a radio frequency identity tag attached to the component, the radio frequency identity tag having a serial number. The receiver 515 is arranged to receive the serial number of the radio frequency identity tag. The processor 520 is arranged to use the receiver 515 to identify the resonant frequency of the radio frequency identity tag. The processor 520 is further arranged to convert the resonant frequency of the radio frequency tag to a temperature of the radio frequency identity tag.

The reader 500 additionally comprises a user interface 540. User interface 540 allows a user to input instructions to the reader 500 and allows the reader 500 to display information to the user. User interface 540 may be a touchscreen interface. The processor 520 may be arranged to receive instructions which, when executed, causes the processor 520 to carry out the above described method. The instructions may be stored on a memory 525.

Where many RFID tags are installed, the reader 500 is arranged to record the serial number and installation location of each radio frequency identity tag in a database 530. When a temperature reading is subsequently obtained the processor 520 determines the location of that temperature reading by looking up the serial number of the radio frequency identity tag in the database 530.

In general, the component and the RFID tag are in thermodynamic equilibrium such that the temperature of the component may be determined to be the same as the temperature of the radio frequency identity tag.

Identifying the resonant frequency of the radio frequency identity tag may comprise transmitting a series of different frequency signals to the radio frequency identity tag and determining the signal strength of a signal received from the radio frequency identity chip for each different frequency signal. This is preferred for a passive RFID tag.

Identifying the resonant frequency of the radio frequency identity tag may comprise detecting the frequency of a signal received from the radio frequency identity chip. This is preferred for an RFID tag that includes a battery, such as an active RFID tag, and for a battery assisted passive RFID tag.

Upon installation of the radio frequency identity tag, the serial number and installation location of the radio frequency identity tag is recorded, such that when a temperature reading is subsequently obtained, the location of that temperature reading can be determined. Such information is preferably stored in a database. The database may be stored in a reader device.

The reader device may be a handheld device with a built transmitter and receiver for interrogating RFID tags. Such a reader device is well suited to passive RFID tags, which require a relatively strong signal to be transmitted to them and a relatively close receiver to detect their transmission.

The reader device may be a centrally located device with a plurality of external antennas directed to interrogate RFID tags in a sub location of a facility. For example, a factory floor may be split into a plurality of zones, each zone having respective antennas for interrogating RFID tags therein. The centrally located reader device may then interrogate each zone in turn to ascertain temperature readings from the plurality of RFID tags therein.

The reader device may comprise at least one long read-in antenna device, the long read-in antenna connected to at least one of the transmitter and receiver. The long read-in antenna device may include a read antenna that comprises a leaky coaxial cable. Such an antenna is able to read a plurality of RFID tags along its length. A long read-in antenna device is placed along the exhaust pipework being monitored in the proximity of one or more RFID tags.

Use of an antenna down the length of a single exhaust pipe allows for isolated read-ins at system specific or pipe-specific micro circuits. By reading in in this way identification of problem areas can be isolated rapidly. With such an arrangement it is also possible to respond to thermal events in the processing equipment that feeds the exhaust pipe to ensure safety of personnel and equipment during processing.

There is further provided a program or plurality of programs arranged such that when executed by a computer system or one or more processors it/they cause the computer system or the one or more processors to operate in accordance with the methods described herein.

There is further provided a machine readable storage medium storing a program or at least one of the plurality of programs described herein.

In the above examples, temperature measurements of a pipe are taken. The present invention may also be applied to a system for distributing electrical power, including but not limited to a busbar. There is also provided a method for detecting a thermal excursion in a component of a system for distributing electrical power, a vacuum pump and abatement system for semiconducting processing equipment, and a compressor system for hydrocarbon processing.

Figure 6:
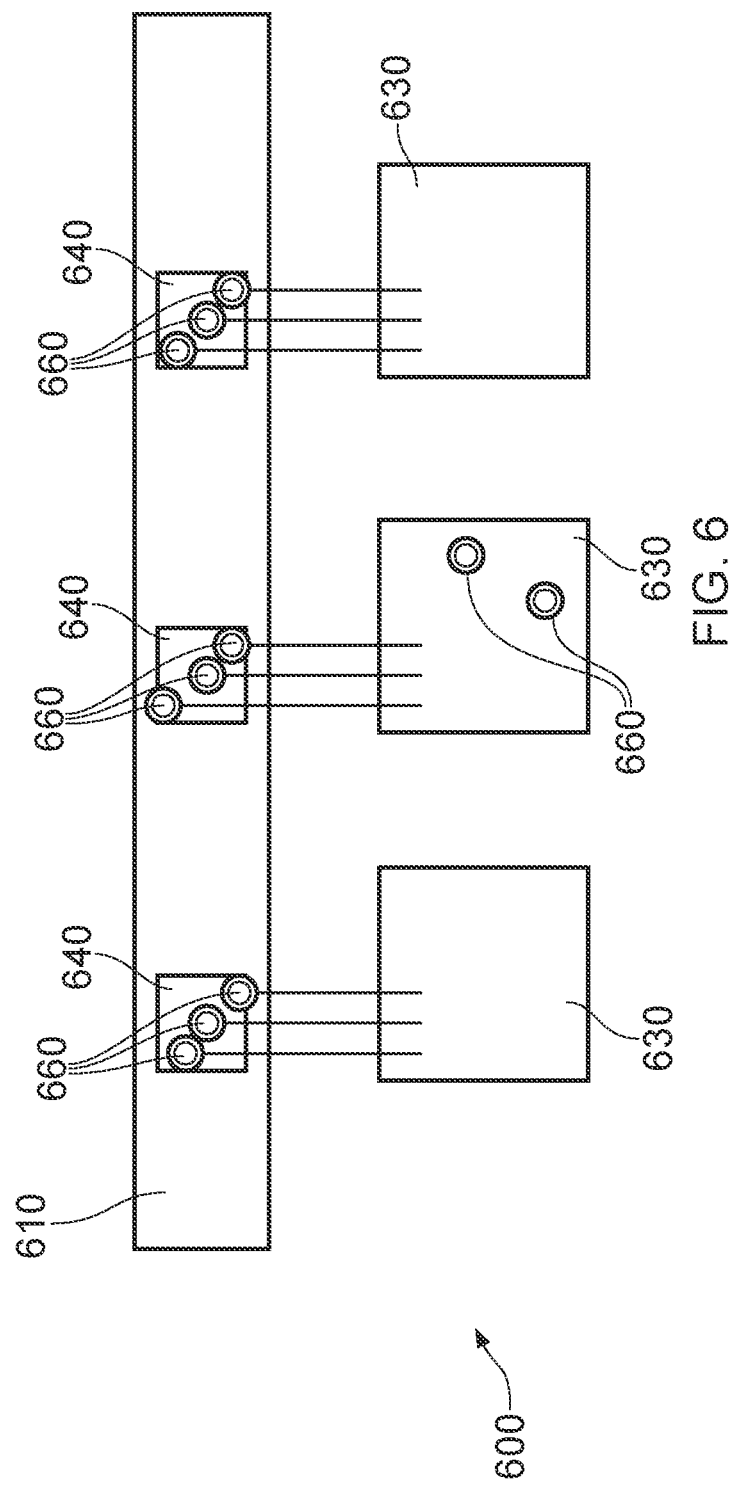
FIG. 6 is a schematic illustration (not to scale) showing a system for distributing electrical power including a temperature detection arrangement as described herein.

FIG. 6 is a schematic illustration (not to scale) showing a system 600 for distributing electrical power including a fault detection arrangement as presented herein. The system 600 comprises a busbar 610; a plurality of electrical modules 630, a plurality of interconnection elements 640, and a plurality of RFID tags 660 as described herein.

The plurality of electrical modules 630 are connected to the busbar 610, by a respective plurality of interconnection elements 640, wherein the busbar 610, the interconnection elements 640 and the electrical modules 630 comprise a plurality of components.

The busbar 610 receives electrical power from a power source and delivers this electrical power to the plurality of modules 630. Interconnection components 640 provide electrical connection between each module 630 and the busbar 640. A busbar provides a space efficient power distribution system for complex electrical equipment, and typically is used where a compact solution is required.

By way of example, a semiconductor manufacturing facility will use a vacuum and abatement system to provide a vacuum for certain processes such as etching or deposition. Such vacuums are typically held at pressures of the order of a millibar. Any gases produced from the semiconductor processing pass through the abatement system. In such a facility, each pump may consume over a kilowatt (kW) in power, each module 630 may comprise one or more pumps, and multiple modules 630 (for example, ten or more) may be connected to the busbar 610. As such, a busbar 610 can be expected to carry tens of kW of electrical power in a small physical space. The busbar 610 typically delivers electrical power as three voltage phases and so comprises at least three electrical conductors, each of which may be a copper rod, or cable. A common voltage of three phase power supplies is 480 volts.

Faults in the power distribution system can be detected by elevated operating temperatures in any one of the components of the system. Such components may include interconnection elements 640. An elevated operating temperature of a component is often caused by an increase in resistance of said component. The components may be power semiconductor devices such as integrated gate bipolar transistors (IGBTs) or a screw in a clamping housing holding two conductors together. An increase in resistance can be the result of a degradation of a power semiconducting device or a loosening connection such as a screw in a clamp connecting two conductors together. In the case of a power semiconductor device, an elevated operating temperature can accelerate the ageing or wear of the power semiconductor device. Similarly, an elevated operating temperature of a loose physical connection can cause it to loosen further as the connection thermally cycles between the hot and relative cold of respective operating and non-operating modes. In either case an elevated operating temperature of a component indicates a likely future failure of that component.

Traditional monitoring technologies for a power distribution system have utilised electrical temperature sensors such as a combination of high voltage insulated infrared sensors and traditional thermocouples. These sensors are located in nominated locations enabling measurement of critical components of a power distribution system.

Thermal Monitoring of electrical systems such as a power distribution system can provide real-time temperature data, enabling operators to maximize load efficiency and balance thermal stresses that can lead to catastrophic failures. Over time, switchgear contacts, bus bars, and critical connection points develop hot spots that slowly corrode causing increased electrical resistance. If left unchecked, even minor increases in resistance can quickly grow out of control as higher resistance creates hotter conductors, which, in turn, creates higher resistance.

Issues with such traditional monitoring technologies are, by way of example:
 a. Excessive size of each sensor is not conducive to compactness and a reduced space claim for the electrical systems.
 b. Infrared sensors typically have to be located around 20 mm away from the component under test; and would not work if mounted directly to the component. This tends to increase the volume of space taken up by the monitoring technology.
 c. Dust build up and contamination can affect the calibration of an infrared sensor.
 d. Each sensor mounting bracket requires notable space.

e. Variations in the test material and finish of a monitored component, such as the same component type from different manufacturing batches, can affect its emissivity and impact the accuracy of an infrared measurements.
f. Each sensor typically must be individually wired, which leads to an excessive wiring space claim; infrared sensors and thermocouples are electrical sensors which typically require their own electrical wiring. Significant wiring complexity and control infrastructure is required for multiple individual sensors.
g. Electrical sensors require electrically conductive wiring which must be electrically isolated from any high voltage components such as the busbar. Such wiring tends to require being hardened to work safely in the high voltage environment of the power distribution system.

There tend to be many bolted connections in a large electrical system. However, traditional techniques for temperature monitoring limits the number of connections that can be monitored in real-time, mainly due to the above-mentioned issues. Because of these limitations, there is only a limited confidence that the monitoring provides enough information to reduce operating costs by enabling longer service intervals and less visual inspection.

Figure 7:
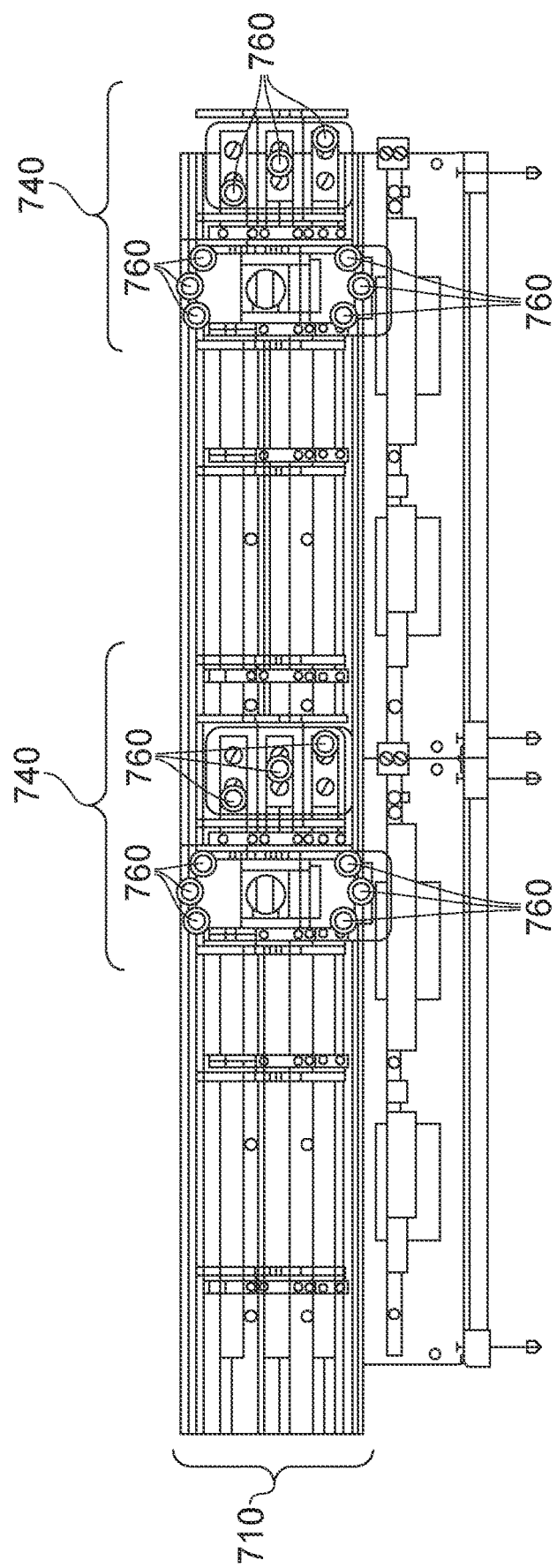
FIG. 7 is a schematic illustration (not to scale) showing a detailed view of a busbar incorporating a plurality of RFID tags as described herein.

The above problems tend to be addressed by a system 600 as illustrated in FIG. 6 by way of the application of a plurality of RFID tags 660. Each RFD tag 660 has a unique serial number and is applied to a component of the power distribution system, FIG. 7 is a schematic illustration (not to scale) showing a detailed view of a power distribution system 700 comprising a busbar 710 incorporating a plurality of RFID tags 760. The interconnection elements 740 for two modules are illustrated mounted to the bus bar 710. Nine RFID tags 760 are mounted to each set of interconnection elements 740 at nine measurement points per set of interconnection elements 740. At each measurement point, an RFID tag 760 is connected to a component of the interconnection element 740.

A connection between the RFID tag 760 and the component of, say, the interconnection element 740 may be provided by, for example: glue, tape, a zip-tie or a mechanical clip. Different connections may be used for different components dependent on practical considerations and restrictions such as available space and component shape. For example, the mounting solution for each RFID tag 760 cable might be a simple sticky pad attached directly to the busbar. Typically, each RFID tag 760 is held adjacent to and touching the component to be monitored. The above described arrangements provide an improved temperature detection arrangement that can be applied to support systems of semiconductor processing equipment.

For example, one of the larger cost additions to heating pipework is the hardware required to obtain temperature indications and how many points of acquisition are required. There is presented herein a cost-effective method to detect temperature by embedding RFID tags in heater construction or applied down a pipe length on the pipe itself. A heater controller is arranged having a UHF RFID reader with resonance frequency detection that scans the entire line. The serial number of each RFID tag is then identified and the corresponding temperature determined from the resonant frequency. This gives a cost-effective way to monitor the entire line where alert systems for exothermic events, line length continuity of temperature, and other analysis can be determined. By correlating the set point to a resonance frequency range, we can also narrow the band of scan and speed the time to obtain all temperatures. For example, each RFID tag can be initially scanned at the resonant frequency it is expected to have given the expected temperature at its location. Accordingly, the RFID tags described herein can be installed in every heater down a line effectively making every heater a readable temperature point vastly improving indication, control, and other application based inputs.

The use of the described system has a number of key benefits over traditional technologies:
a. The RFID tag can be directly mounted to components such as busbars and critical connections maximising flexibility in the sensor location and minimising the space claim required to accommodate sensors and fixings.
b. The radio measurement remains unaffected by factors other than the temperature of the component under test such as component surface finish or material.
c. The exact sensor positions can be selected at installation and are not restricted by issues such as wiring length which affect electrical sensors.
d. The space saving of using RFID tags vs wired sensors allows for many more temperature measurement locations within a power distribution system, and even the possibility of redundant measurements with two spatially separated fiber Bragg gratings in different RFID tags assigned to measure the temperature of a single critical component.
e. The RFID tag is encased in an electrically isolated envelope and does not require conductive wiring back to a control unit. The RFID tag does not require insulated wires or additional isolation from electrical components, this means that there are fewer restrictions on sensor placement within the power distribution system for the RFID tag as compared to an electrically wired sensor.

The system and method described herein thus provides a flexibility in design that means many additional components, previously not thought to be as critical, can be thermally monitored. The above-described thermal monitoring system and method tends to allow a fundamental change to the maintenance regime of a system for distribution electrical power as described herein. Because the temperature of so many more components can be monitored, a system operator can be assured that the electrical system is operating optimally, and that any fault will be quickly detected as a rise in temperature at a particular component as the fault begins to develop. This assurance allows the system operator to reduce the amount of preventative maintenance and to run the system with longer service intervals. The system and method described herein thus reduces downtime and reduces costs. Furthermore, the described system and method can be implemented with a small space claim, which is important in systems requiring space efficient power delivery in the form of a busbar.

There is further provided a vacuum pump and abatement system for semiconducting processing equipment may comprising a system for distributing electrical power as described herein.

There is further provided a compressor system for hydrocarbon processing may comprise a system for distributing electrical power as described herein.

The RFID tag described herein is designed to operate at temperatures up to 260° C. and as such a polyimide film is used to encapsulate the electronic components. In certain implementations operation up to 200° C. is acceptable and in such a situation the polyimide case can be replaced with silicone. In other embodiments materials other than polyimide and silicone are used for the case of the RFID tag. Any electrical insulating material suitable for the expected temperatures of the exhaust pipe and that allows radio frequencies to penetrate the case and into the antenna of the RFID tag can be used.

Using the properties of RFID tags and the temperature dependent resonance frequency shift is a cost-effective way to monitor the temperature of components such as process pipes or power distribution systems without the need of expensive analysis chips, wires, and sensing devices.

An apparatus for detecting the temperature of a component, for implementing the above arrangement, and performing the method steps described herein, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media. The additional modules may comprise UHF antennas suitable for interrogating RFID tags described herein.

It should be noted that certain of the process steps depicted in the flowchart of FIG. 4 and described above may be omitted or such process steps may be performed in differing order to that presented above and shown in FIG. 4. Furthermore, although all the process steps have, for convenience and ease of understanding, been depicted as discrete temporally sequential steps, nevertheless some of the process steps may in fact be performed simultaneously or at least overlapping to some extent temporally.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A method of detecting the temperature of a process pipe of semiconductor processing equipment, the method comprising:
   applying a radio frequency identity tag to the process pipe, the radio frequency identity tag having a serial number and comprising:
      an antenna arranged to be placed in thermal communication with the process pipe;
      an electrically insulating pad, the electrically insulating pad separating the antenna from the process pipe;
      electrical parts electrically coupled to the antenna and arranged to be remote from the process pipe; and
      a thermal insulation layer, the thermal insulation layer separating the electrical parts of the radio frequency identity tag from the antenna, the insulating pad, and the process pipe;
   recording the serial number and an installation location of the radio frequency identity tag in a database;
   reading the radio frequency identity tag with a reader, the reader arranged to read the serial number of the radio frequency identity tag, and to identify the resonant frequency of the radio frequency identity tag;
   converting the resonant frequency of the radio frequency tag to a temperature of the radio frequency identity tag; and
   looking up the serial number of the radio frequency identity tag in the database to associate the temperature of the radio frequency identity tag with the installation location of the radio frequency identity tag.

2. The method of claim 1, wherein the temperature of the process pipe is determined to be the same as the temperature of the radio frequency identity tag.

3. A non-transitory computer-readable medium having stored thereon programs arranged such that when executed by a computer system cause the computer system to operate in accordance with the method of claim 1.

4. A radio frequency identity tag for detecting the temperature of a component of a support system for semiconductor processing equipment, the radio frequency identity tag comprising:
   an antenna arranged to be placed in thermal communication with the component;
   an electrically insulating pad, the electrically insulating pad separating the antenna from the component;
   electrical parts electrically coupled to the antenna and arranged to be remote from the process pipe; and
   a thermal insulation layer, the thermal insulation layer separating the electrical parts of the radio frequency identity tag from the antenna, the insulating pad, and the pipe.

5. The radio frequency identity tag of claim 4, wherein the antenna, electrically insulating pad and electrical parts are encased in a case.

6. The radio frequency identity tag of claim 4, further comprising an adhesive pad for affixing the electrically insulating pad to the component.

7. The radio frequency identity tag of claim 4, wherein the radio frequency identity tag is one of:
   a passive tag,
   an active tag, and
   a battery assisted passive tag.

8. The radio frequency identity tag of claim 4, wherein the electrical parts include a memory for storing a serial number, the serial number transmitted by the radio frequency identity tag when the radio frequency identity tag is interrogated.

9. The radio frequency identity tag of claim 4, wherein the electrically insulating pad is an electrical insulator and is thermally conductive.

* * * * *